United States Patent
Wang et al.

(10) Patent No.: US 10,862,158 B2
(45) Date of Patent: Dec. 8, 2020

(54) HIGH CAPACITY ANODE ELECTRODES WITH MIXED BINDERS FOR ENERGY STORAGE DEVICES

(71) Applicant: A123 Systems LLC, Waltham, MA (US)

(72) Inventors: Jun Wang, Shrewsbury, MA (US); Ronnie Wilkins, Melrose, MA (US); Paul Gionet, Billerica, MA (US)

(73) Assignee: A123 SYSTEMS LLC, Waltham, MA (US)

(*) Notice: Subject to any disclaimer, the term of this patent is extended or adjusted under 35 U.S.C. 154(b) by 131 days.

(21) Appl. No.: 15/761,000

(22) PCT Filed: Sep. 29, 2016

(86) PCT No.: PCT/US2016/054512
§ 371 (c)(1),
(2) Date: Mar. 16, 2018

(87) PCT Pub. No.: WO2017/059117
PCT Pub. Date: Apr. 6, 2017

(65) Prior Publication Data
US 2018/0261881 A1    Sep. 13, 2018

Related U.S. Application Data

(60) Provisional application No. 62/234,571, filed on Sep. 29, 2015.

(51) Int. Cl.
*H01M 10/0525* (2010.01)
*H01M 4/04* (2006.01)
(Continued)

(52) U.S. Cl.
CPC ....... *H01M 10/0525* (2013.01); *H01M 4/043* (2013.01); *H01M 4/134* (2013.01);
(Continued)

(58) Field of Classification Search
CPC .. H01M 10/0525; H01M 4/043; H01M 4/134; H01M 4/1395; H01M 4/364;
(Continued)

(56) References Cited

U.S. PATENT DOCUMENTS 7,785,661 B2 * 8/2010 Carel .................. H01M 4/0416
427/122
2009/0111026 A1    4/2009 Kim et al.
(Continued)

FOREIGN PATENT DOCUMENTS

| CN | 101447561 A | 6/2009 |
| CN | 101740747 A | 6/2010 |

(Continued)

OTHER PUBLICATIONS

ISA Korean Intellectual Property Office, International Search Report and Written Opinion Issued in Application No. PCT/US2016/054512, dated Jan. 13, 2017, 14 pages.
(Continued)

*Primary Examiner* — Amanda C. Walke
(74) *Attorney, Agent, or Firm* — McCoy Russell LLP

(57) ABSTRACT

A silicon anode comprising a hybrid binder at a blending ratio of 10-90 wt. % for use in a Li-ion battery is provided. The combination of a hybrid binder in the Si anode for use in a rechargeable Li-ion cell shows the unexpected result of extending the cycle life and a balancing effect between adhesion strength and first cycle efficiency.

20 Claims, 7 Drawing Sheets

(51) Int. Cl.
  *H01M 4/134*   (2010.01)
  *H01M 4/1395*   (2010.01)
  *H01M 4/38*   (2006.01)
  *H01M 4/66*   (2006.01)
  *H01M 4/62*   (2006.01)
  *H01M 4/36*   (2006.01)
  *H01M 4/587*   (2010.01)

(52) U.S. Cl.
  CPC ......... *H01M 4/1395* (2013.01); *H01M 4/364* (2013.01); *H01M 4/386* (2013.01); *H01M 4/587* (2013.01); *H01M 4/621* (2013.01); *H01M 4/622* (2013.01); *H01M 4/623* (2013.01); *H01M 4/661* (2013.01)

(58) Field of Classification Search
  CPC ........ H01M 4/386; C01B 33/00; C01B 33/02; H01G 11/50; H01G 11/22; H01G 11/46
  See application file for complete search history.

(56) References Cited

U.S. PATENT DOCUMENTS

| | | | |
|---|---|---|---|
| 2009/0136845 A1* | 5/2009 | Choi | H01M 4/623 429/212 |
| 2010/0129704 A1 | 5/2010 | Luo et al. | |
| 2013/0034651 A1* | 2/2013 | Buqa | H01M 4/622 427/58 |
| 2015/0125747 A1 | 5/2015 | Yang et al. | |
| 2019/0148732 A1* | 5/2019 | Takahashi | H01M 4/622 429/217 |

FOREIGN PATENT DOCUMENTS

| | | |
|---|---|---|
| CN | 102290577 A | 12/2011 |
| CN | 102916190 A | 2/2013 |
| JP | H08213022 A | 8/1996 |
| JP | H1145720 A | 2/1999 |
| JP | 2009135103 A | 6/2009 |
| JP | 2012510142 A | 4/2012 |
| KR | 20140080837 A | 7/2014 |
| WO | 2004049475 A1 | 6/2004 |
| WO | 2010130975 A1 | 11/2010 |
| WO | 2011122261 A1 | 10/2011 |

OTHER PUBLICATIONS

European Patent Office, Extended European Search Report Issued in Application No. 16852622.6, dated Mar. 28, 2019, Germany, 9 pages.
State Intellectual Property Office of the People's Republic of China, Office Action Issued in Application No. 201680056003.4, dated Jun. 5, 2020, 17 pages. (Submitted with Partial Translation).
Japanese Patent Office, Office Action Issued in Application No. 2018-515923, dated Jul. 7, 2020, 6 pages.

* cited by examiner

HIGH CAPACITY ANODE ELECTRODES WITH MIXED BINDERS FOR ENERGY STORAGE DEVICES

CROSS REFERENCE TO RELATED APPLICATION

The present application is a U.S. National Phase of International Patent Application Serial No. PCT/US2016/054512, entitled "High Capacity Anode Electrodes With Mixed Binders For Energy Storage Devices," filed on Sep. 29, 2016. International Patent Application Serial No. PCT/US2016/054512 claims priority to U.S. Provisional Application No. 62/234,571, entitled "High Capacity Anode Electrodes With Mixed Binders For Energy Storage Devices", filed Sep. 29, 2015. The entire contents of each of the above-cited applications are hereby incorporated by reference in their entirety for all purposes.

TECHNICAL FIELD

This disclosure relates to a lithium ion battery, and more particularly, to fabrication of a silicon anode with a hybrid binder to improve cell cycle life, first cycle efficiency, and adhesion strength.

BACKGROUND AND SUMMARY

Lithium ion (Li-ion) batteries are a type of rechargeable battery that produces energy from an electrochemical reaction. In typical Li-ion batteries, the cell includes lithium metal oxides or lithium metal phosphates for the positive electrode (or cathode), carbon/graphite for the negative electrode (or anode), a lithium salt in an organic solvent for the electrolyte, and a porous separator that ensures the electrodes do not touch. In rechargeable Li-ion batteries, the negative electrode is capable of storing a substantial amount of lithium at a lithium chemical potential above that of lithium metal. When a Li-ion battery is charged, lithium ions travel from the positive electrode to the negative electrode and vice-versa when discharged.

Recently, silicon (Si) has found use as an anode electroactive material in Li-ion batteries wherein the silicon may be present as an alloy, intermetallic compound, oxide, etc. Silicon based anode materials are capable of alloying with relatively large amounts of lithium. However, silicon undergoes a relatively large volume change when lithium is incorporated therein. This volume change may be disadvantageous in battery systems since it can cause a loss of capacity, a decrease in cycle life and mechanical damage to the battery structure.

Because of silicon's potential advantages as an anode in a Li-ion battery system, the prior art has made attempts to overcome problems of mechanical damage and swelling. Use has been made to utilize binders to mitigate the volume change associated with Si anodes. The use of binders such as carboxyl methylcellulose (CMC) and styrene butadiene rubber (SBR), polyvinylidene fluoride (PVdF), polyacrylic acid (PAA), polyacrylonitrile (PAN), and alginate have been applied to Si anodes with limited success.

One approach to overcome some of the difficulties associated with silicon anodes is to provide a rigid binder. Binders commonly used with graphite anodes in Li-ion cells, such as polyvinylidene fluoride (PVDF), do not bind silicon anode material together cohesively over successive charging cycles due to the relatively large volume changes of silicon anodes, as described in Loveridge et al in WO 2010/130975A1. Thus, conventional water based binders, such as carboxymethyl cellulose (CMC), polyacrylic acid (PAA), and carboxymethyl cellulose and styrene butadiene composite (CMC/SBR) for example, which are rigid and provide added strength to help counteract the volume expansion issues of Si anodes, may be used with Si. Thus, the binder in a silicon based anode influences the cycling stability and influences the composite electrode's performance.

The inventors herein have recognized potential issues with the above approaches. Namely, the use of water based binders for Si anodes may result in improved capacity over the initial cycles of a battery but then may suffer from poor adhesion. The use of non-water based binders such as PVDF, which may display high strong adhesion properties, are known to not withstand the volume changes associated with Si anodes. Moreover, PVDF is only soluble in organic solvents such as NMP, for example. Aqueous-based binders, such as PAA and CMC, are soluble in water. It is known in the art that, in order to form a functional slurry of proper viscosity, PVDF binders are used in solvent based systems, and PAA and CMC binders are used in aqueous based systems. Thus, prior approaches may be limited in the choosing of either an aqueous based system binder or a non-aqueous solvent based system binder due to the incompatible solubility of each. As such, prior approaches may sacrifice adhesion strength for first cycle efficiency or vice versa, and thus may not be able to strike a balance between adhesion strength, cycling stability, and first cycle efficiency.

One approach as recognized by the inventors to address in part the above issues includes fabricating an anode comprising silicon, wherein the anode comprises a hybrid binder that has a blending ratio of 10 wt. % to 90 wt. %. A silicon containing powder may be mixed with the hybrid binder to prepare a thin coating on a copper current collector. The Si/hybrid binder laminate may be compressed to fabricate the anode. The Li-ion cell assembly includes a cathode, the anode as prepared, a separator, and an electrolyte solution. Unexpectedly, the cell with the Si/hybrid binder anode may provide a balance and optimization between adhesion strength, cycling stability, and first cycle efficiency. In this way, hybrid binder based Si anodes allow for optimization between characteristics between previously thought incompatible binders, e.g., water-based binders and organic solvent-based binders. The ratio of the binders may be chosen in a way as to bring forth the positive characteristics of the binders while mitigating the potentially negative characteristics of the individual binders in the combination.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree.

Figure 4:
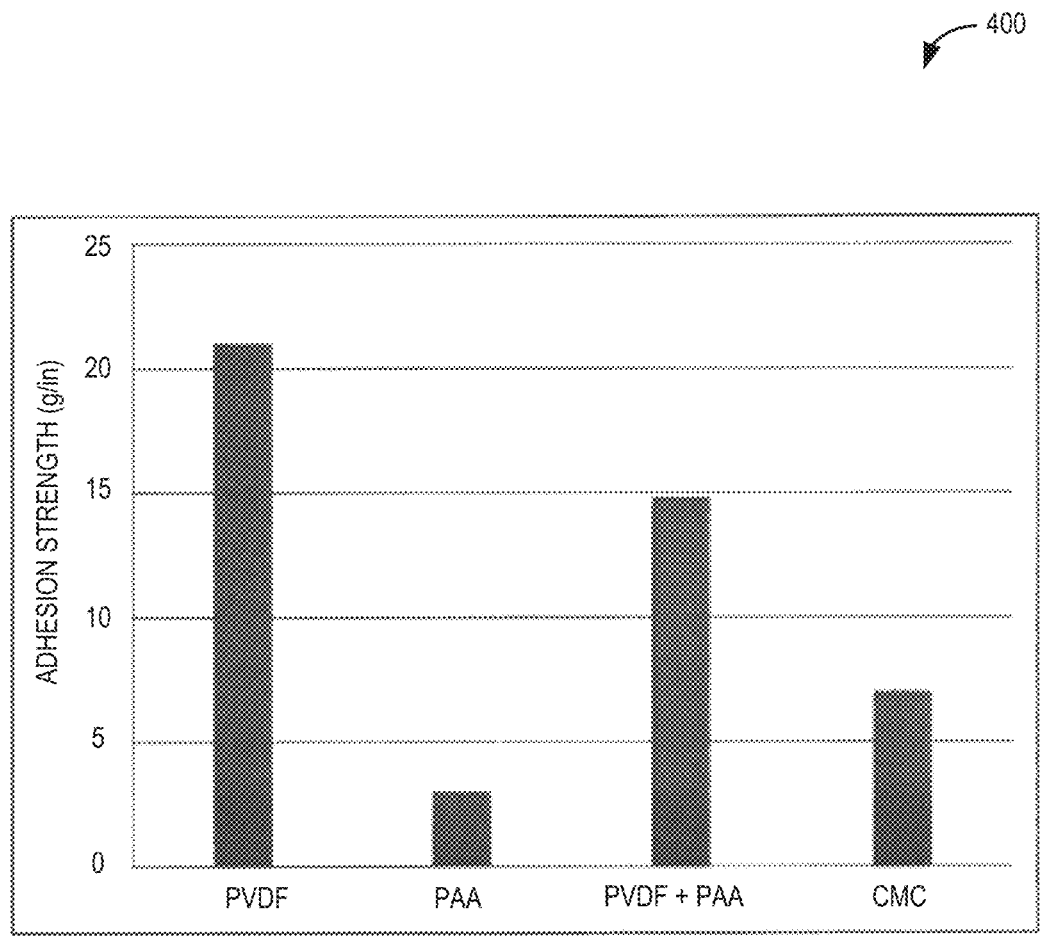
FIG. 4 illustrates an example chart for the adhesion strength of various binders, including a hybrid binder of PVDF and PAA.
Figure 5:
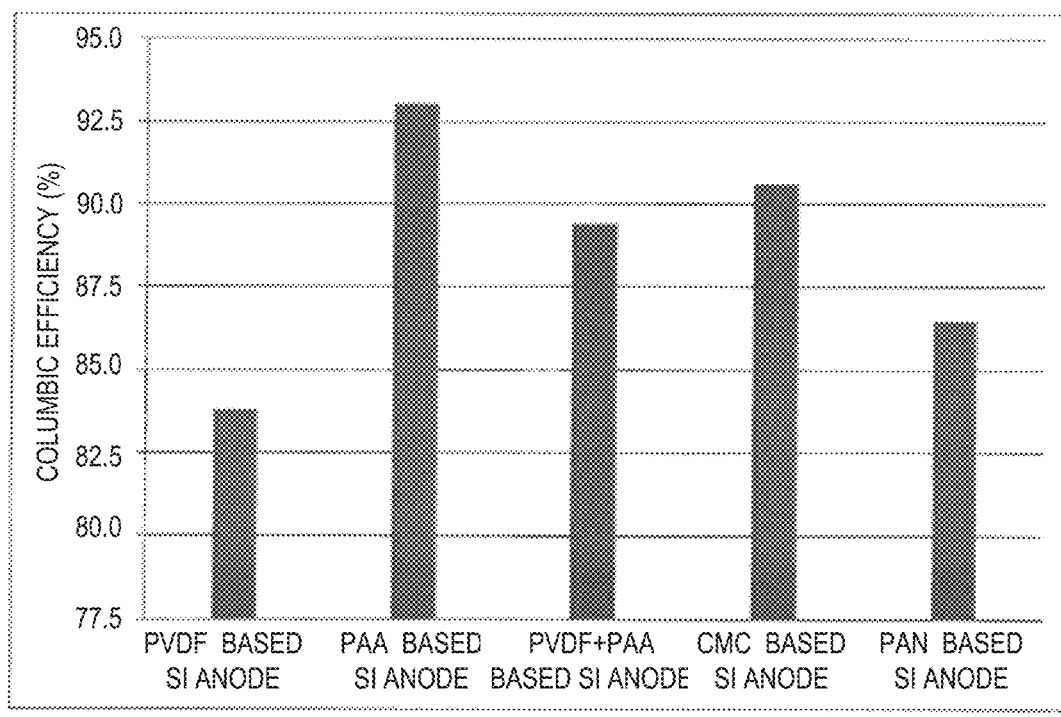
FIG. 5 illustrates an example chart for the first cycle columbic efficiency of PVDF, PAA, PVDF/PAA, CMC, and PAN based Si anodes.
Figure 6:
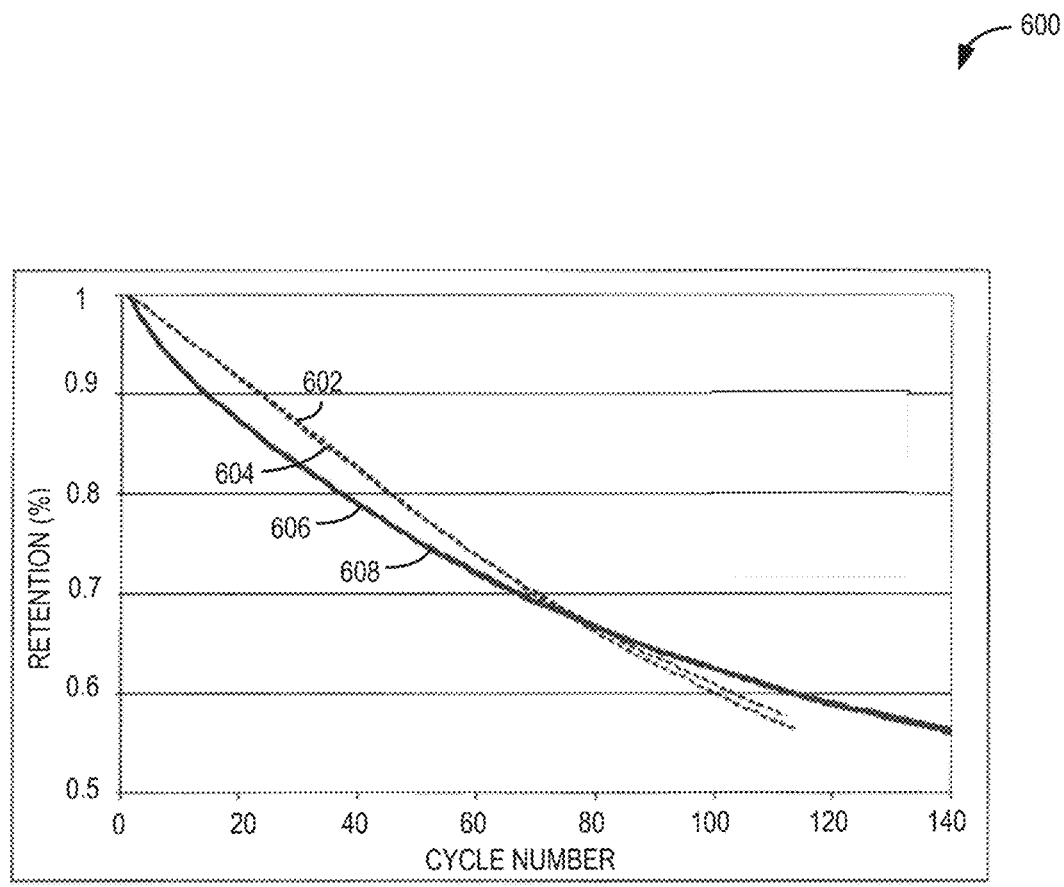
FIG. 6 illustrates the cycle life of Li-ion single layer pouch cells of PVDF and PVDF/PAA based Si anodes.

The present application relates to a Li-ion rechargeable battery which comprises a Si anode capable of intercalating and releasing lithium, a positive electrode, a separator, and an aqueous or nonaqueous electrolytic solution consisting of a lithium salt and at least one organic solvent. The Si anode may be fabricated with a hybrid binder, as described in FIGS. 2 and 3, to improve the cycle life of the Li-ion cell. The fabrication of the hybrid binder, as described in FIG. 1, allows for an unexpected combination of a water-based binder and a non-water based binder, for example. The use of a hybrid binder as compared to conventional water based binders or non-water based binders in a Si anode may improve adhesion strength over Si anodes with water-based binders as illustrated in FIG. 4. The addition of the hybrid binder to the Si anode may improve first cycle columbic efficiency over Si anodes with non-water based binders, as illustrated in FIG. 5. A hybrid binder based Si anode may also display an increase of capacity retention over PVDF-based Si anodes as shown in FIG. 6. Thus, the unique combination of the hybrid binder, which may be applied to a water-based or solvent-based system, and a Si anode allows for balancing of adhesion strength and first cycle efficiency, for example. The present disclosure allows for a method of producing a hybrid binder based Si anode, a combination that is contrary to prior knowledge of water based binders and solvent based binders. This unexpected combination of binders with a Si anode shows an unexpected result of extending the cyclability of the Li-ion cells, and shows the retention of the positive characteristics of each of the individual binder while reducing the negative impact of the said binders.

Figure 1:
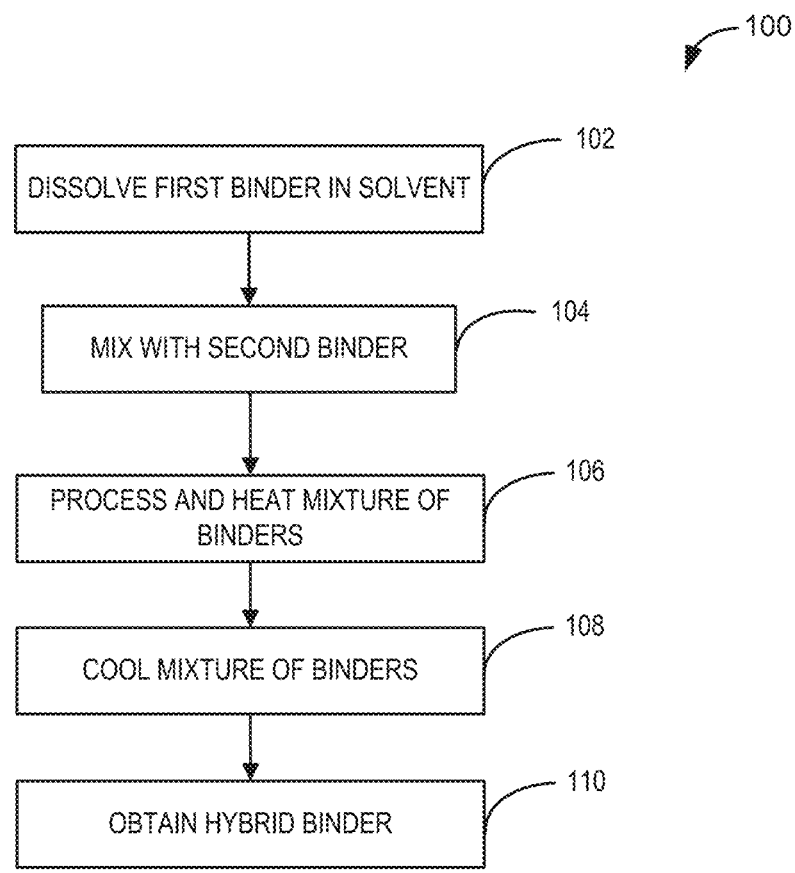
FIG. 1 illustrates an example method flow chart of producing a hybrid binder for use with a Si anode.

Turning to FIG. 1, an example method 100 for preparing a hybrid binder for use with a silicon anode is provided. In one example the hybrid binder may be a mixture of PVDF and PAA. In another example, mixtures of PVDF/PAN, PAN/PAA, and PVDF/CMC may also be prepared as hybrid binders. In another example, the hybrid binder may be a combination of an aqueous system binder (e.g., water soluble binder) and a solvent system binder (e.g., NMP soluble binder).

At step 102, a binder may be dissolved in a solvent. In one example, PVDF may be dissolved in a solvent such as NMP. In another example, PVDF may be dissolved in a water based solvent when water-compatible PVDF is used. In yet another example, PAA may be dissolved in an aqueous based system, such as water. The process of dissolving may include applying heat and/or stirring. In one example, the mixing temperature may be from room temperature (23° C.) to 60° C. applied for 8 to 16 hours with continuous stirring.

At step 104, a second binder may be added to the first binder and solvent mixture. In one example, PAA is added to a mixture of PVDF and NMP. The mass ratio of PVDF to PAA may range from 0.1:1 to 9:1, for example. In another example, the mass ratio may be 2:1. Other examples of NMP mixture of binders include PVDF/PAN, and PAN/PAA. The blending ratio of the above blends may range from about 10 wt. % to 90 wt. % (e.g., the ratio of PVDF to PAA, or the first component of the hybrid binder to the second component of the hybrid binder). In one example, the combination of polymers is a blend and the polymers are not cross-linked. In another example, PVDF may be added to a mixture of CMC and water, or CMC may be added to a mixture of PVDF and water. In this way, PVDF is not limited to an organic solvent, and PAA is not limited to an aqueous system, for example.

At step 106, the mixture of binders in the solvent may be processed further. For example, the surface of the second binder may be engineered to promote solubility. Simply mixing the normally incompatible binders is not enough to create a functional slurry. The surface of the hybrid binder may be hydrophobic or hydrophilic depending on the solvent system, e.g., the surface of the hybrid binder may be hydrophilic in an aqueous solvent system, and the surface of the hybrid binder may be hydrophobic in a non-aqueous solvent system. In one example, the mixture may be stirred and/or heated to dissolve the second binder. In one example, the second binder in the mixture is dissolved at 60° C. for up to 8 hours under stirring. In another example, a PAA binder that is compatible with an NMP solvent system is used.

At step 108, the mixture of binders may be cooled to room temperature.

At step 110, a hybrid binder may be obtained. In this way, traditionally water-based binders may be unexpectedly used in an organic solvent based system, and traditionally solvent based binders may be unexpectedly used in an aqueous solvent based system.

Figure 2:
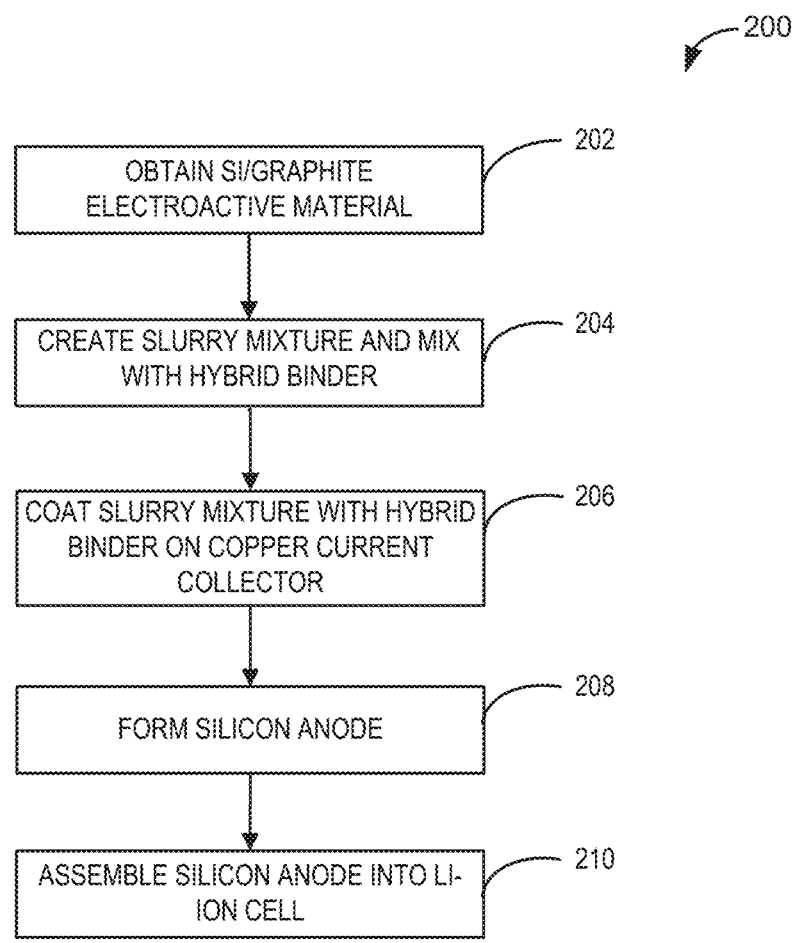
FIG. 2 illustrates an example method flow chart of producing a Si anode with a hybrid binder to provide an unexpected balance between adhesion strength and first cycle efficiency.

Turning to FIG. 2, a method of fabricating a silicon anode with the hybrid binder of method 100, for example, is provided. Silicon as an electroactive material for use in Li-ion batteries provides a material which is capable of alloying with relatively large amounts of lithium.

At step 202, the Si electroactive material may be obtained. In another example, a silicon oxide may be obtained. In yet another example, the silicon electroactive material may be a nanoparticle or a nanowire. In the example provided, the Si electroactive material may be present as a Si graphite composite powder. In other examples, the Si may be present as Si, an alloy or intermetallic compound of Si, or an oxide, carbide, nitride, sulfide, phosphide, selenide, telluride, antimonide, or their mixtures of Si, for example. In yet another example, the electroactive material may include a carbonaceous precursor which upon application of heat, deposits carbon on the primary and/or secondary particles of the electroactive material. The electroactive material primary and secondary particles may include carbonaceous deposits on the surfaces thereof.

At step 204, a slurry mixture may be created. A slurry is created by mixing the Si electroactive material together with a hybrid binder, such as the hybrid binder obtained in method 100, for example, and a non-aqueous liquid or aqueous liquid. The hybrid binder may be mixed with the Si electroactive material. In one example, the binder may be present as PVDF and PAA in a blending ratio of 10 wt. % to 90 wt. %. In another example mass ratio of PVDF to PAA is 2:1. In yet another example the binder may be present as water based PVDF and CMC. In yet another example, the binder may be present as NMP based PAN and PAA. The hybrid binder may be present at a weight percent between 2 wt. % and 15 wt. % of anode electroactive material, and may depend on Si content, for example. Further, in another example, the hybrid binder may be present between 5 wt. % and 12 wt. %. In still a further example, the hybrid binder may be present at 10 wt. %. In another example, conductive additives may be added as well, e.g. a conductive additive may be mechanically mixed with the Si electroactive material. The conductive additive may be, but is not limited to, carbon black, vapor grown carbon fibers, graphene particles, or expanded graphite. The conductive additive may be present at equal to or less than 5 wt. %. In another example, no conductive additive may be present. In one example, the conductive additive may be mixed with the anode electroactive material.

At 206, the slurry made by mixing the Si electroactive material with a hybrid binder is coated on a copper (Cu) current collector. The slurry is dried on the current collector and compressed to fabricate the silicon anode at step 208. In one example, the slurry may be coated on both sides of the Cu current collector. In another example, the slurry may be coated on one side of the Cu current collector.

At step 210, silicon anode coated with a Si electroactive material and binder may be assembled into the Li-ion cell. The Li-ion cell may comprise a cathode including a cathode current collector, a separator, an electrolyte, and a silicon anode fabricated as described above. The Li-ion cell may show improved cycle life and a balance of adhesion strength and first cycle efficiency.

One example of fabricating a Si anode following method 200 may include a Si electrochemically active material, a surface coating, and a hybrid binder in a range of 2-15 wt. %. The Si electrochemically active material may be prepared from an anode powder, such as a composite of silicon and graphite wherein the silicon powder comprises silicon nanowires grown on a graphite base. The anode powder may be combined with a hybrid binder, wherein the binder may be a combination PVDF and PAA in a mass ratio of 2:1. The anode powder and hybrid binder mixture may then be coated onto a copper current collector and then calendered to fabricate an anode. In one example, the Si anode may be pre-lithiated.

Thus, method 200 provides a unique approach to fabricate an enhanced Si anode with either a hybrid binder in a solvent based system or an aqueous based system. It may be appreciated that method 100 and 200 may be undertaken sequentially to avoid the formation of microgels, e.g., the hybrid binder is fully formed before its integration into the anode.

Figure 3:
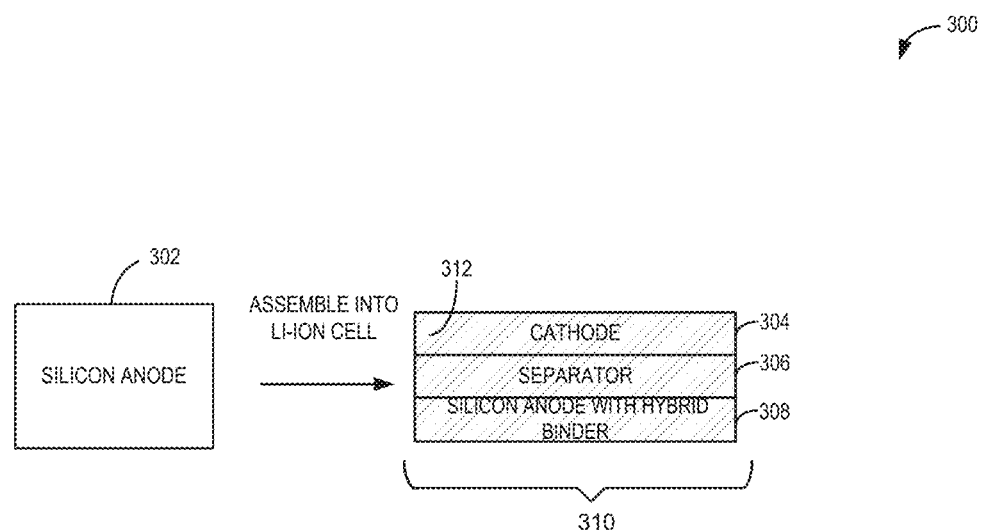
FIG. 3 schematically illustrates an example of the Li-ion cell comprising a Si anode with the hybrid binder.

FIG. 3 illustrates schematic 300, which illustrates the steps to fabricating a silicon anode in a Li-ion cell. In another example, a carbon anode may be used in place of the silicon anode.

A silicon anode 302 such as described in regards to FIG. 2 is obtained. The silicon anode 302 may be a fully fabricated electrode. Thus, in some examples, it will be appreciated that the silicon anode 302 may be included in a Li-ion cell with no further treatment. The silicon anode may then be assembled into a Li-ion cell 310 as outlined in step 210 in method 200 of FIG. 2. The Li-ion cell may comprise a cathode 304, a separator 306, and the silicon anode 308. Further, an electrolyte 312, indicated by the shaded box, may be disposed throughout the Li-ion cell. The electrolyte may be in contact with both electrodes.

The cathode 304 may include a cathode active material on a cathode current collector. The cathode active material may be one of a NCA, a Li oxide, such as a Lithium metal oxide for example, a material capable of intercalating/de-intercalating Li ion, etc. Further, a binder may be mixed with the cathode active material.

The separator 306 has no particular restriction on the source material or morphology of the separator for the Li-ion cell of the present application. Additionally, the separator serves to separate the anode and the cathode so as to avoid their physical contact. The preferred separator has high ion permeability, a low electrical resistance, excellent stability against the electrolytic solution and excellent liquid holding properties. Example materials for the separator may be selected from nonwoven fabric or porous film made of polyolefins, such as polyethylene and polypropylene, or ceramic coated materials.

The electrolyte 312 may comprise Li salt, organic solvents, such as organic carbonates, and additives. The electrolyte is present throughout the Li-ion cell and in physical contact with the anode, cathode, and separator. The molar concentration of the lithium salt may be between 0.5 and 2.0 mol/L. The lithium salt may be selected from the group consisting of $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, LiBOB, LiTFSi, and $LiC(CF_3SO_2)_3$. Further, the electrolyte may comprise aprotic solvents. For example, the solvent may comprise at least one of ethylene carbonate, propylene carbonate, butylene carbonate, dimethyl carbonate, diethyl carbonate, and ethyl methyl carbonate, γ-valerolactone, methyl acetate, methyl propionate, tetrahydrofuran, 2-methyl tetrahydrofuran, tetrahydropyran, dimethoxyethane, dimethoxymethane, ethylene methyl phosphate, ethyl ethylene phosphate, trimethyl phosphate, triethyl phosphate, halides thereof, vinyl ethylene carbonate and fluoroethylenecarbonate, poly(ethylene glycol), diacrylate, and combinations thereof.

Thus, a Li-ion cell may be fabricated comprising the silicon anode, the cathode, the separator and the electrolyte. The Li-ion cell may be fabricated as a prismatic cell in one example. In another example, the Li-ion cell may be a pouch cell. The Li-ion cell may be used in rechargeable batteries to provide the unexpected result of improved cycle life performance and balance of adhesion strength and first cycle efficiency due to the unexpected combination of a hybrid binder and Si anode.

Turning to FIG. 4, a chart 400 is illustrated which shows the adhesion strengths for PVDF versus conventional water based binders CMC and PAA, and versus a hybrid binder of PVDF and PAA. A mixed binder of PVDF and PAA with mass ratio of 2:1 exhibited adhesion strength of 14.8 g/in, approximately 2 times that of the CMC based sample, and approximately 4 times that of the PAA based sample. In one example, a Si anode with the mixed binder exhibited an adhesion strength of at least 70% that of the PVDF based Si anode. As such, significant increases in adhesion strength was exhibited in the hybrid binder Si anode compared to the PAA and CMC binder based Si anodes. In another example, the Si anode with mixed binder exhibited at most about 32% adhesion reduction compared to that of a PVDF binder. As discussed below in FIG. 5, the mixed binder anode displayed a significantly greater first cycle efficiency compared to that of the PVDF based anode.

Turning to FIG. 5, a chart 500 is illustrated which shows first cycle columbic efficiency of Si anodes with various binders. As shown in FIG. 5, the first cycle efficiency of cells assembled with a hybrid binder of PVDF and PAA can be significantly improved over PVDF based Si anodes. An increase of about 13.6% in first cycle life efficiency was observed with mixed binders for the same Si anode, resulting in more cell capacity and energy when compared with PVDF based Si anode cells. This represents a significant gain in terms of cell energy density per unit measure, which is a key attribute for high energy rechargeable batteries. In this way, the mixed binder anodes exhibited a balance between adhesion strength and first cycle efficiency.

FIG. 6 illustrates a graph 600 of the cycle life of example silicon anode electrodes coated with various binders. The electrodes were built into single layer pouch cells and cycle life tested to compare performance. Lines 602 and 604 represent PVDF/PAA pouch cells tested under different conditions, lines 606 and 608 represent PVDF pouch cells treated under different conditions, wherein the pouch cells were tested with C/2 charge and discharge at room temperature, between 3.0V and 4.3V, and at 100% depth of discharge (DOD). The cells with mixed binders showed approximately 4% more capacity retention than that of PVDF before 75% retention was reached. Thus, cells with the hybrid binder unexpectedly displayed better cycle life before 67% retention.

Figure 7:
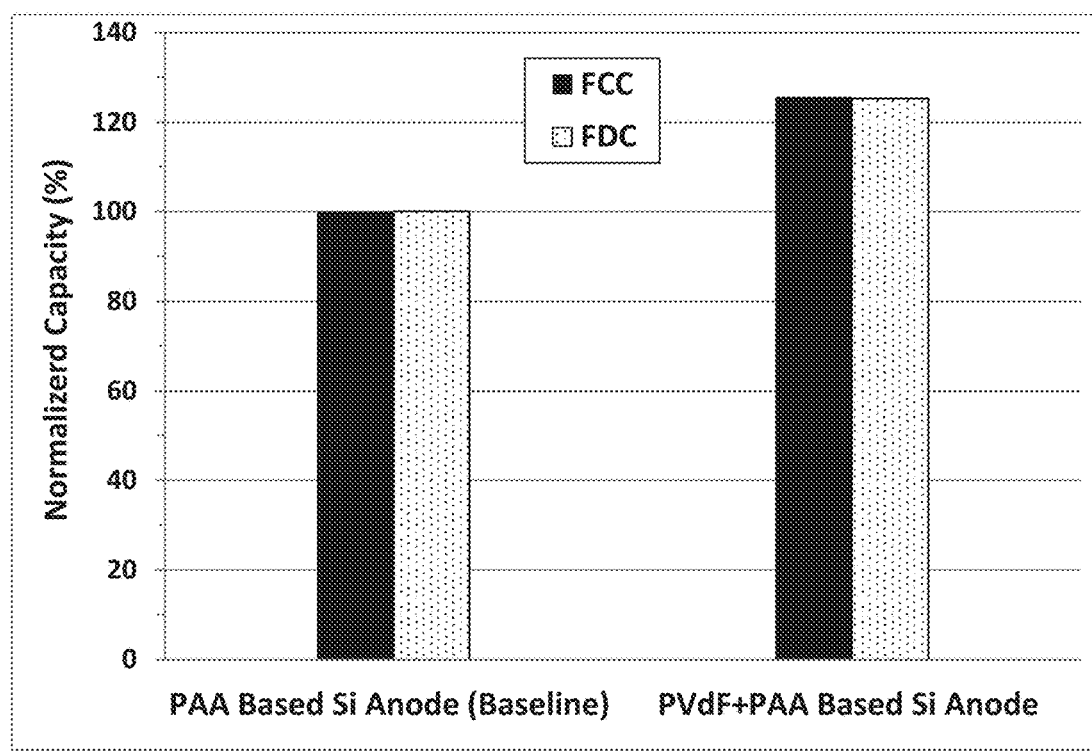
FIG. 7 illustrates first cycle capacity comparison of PAA and PVdF+PAA based Si anode half cell coin cells

Turning now to FIG. 7, a chart is illustrated at 700 showing a first cycle capacity comparison of PAA and PVdF+PAA based Si anode binders. As illustrated, the PAA-based Si anode shows a normalized capacity percentage of 100 percent for the FCC (first charge capacity) and 100% for FDC (first discharge capacity). In repeated examples, the hybrid binder PVdF+PAA-based Si anode shows a significantly higher capacity with increased normalized capacity for FCC and increased capacity for FDC while maintaining approximately the same efficiency. Specifically, using half cell coin cell data for 1900 mAh/g powder, the hybrid PVDF+PAA-based Si anode binder was found to have significantly higher capacity based on target FCC/FDC while maintaining cycle efficiency of approximately 84-85%.

The combination of the flexibility and inherent resilience of the PVDF binder, which allows for strong adhesion, and the PAA binder, which provides increased first cycle efficiency, provides the unexpected properties seen in the Si/hybrid binder anode used in high energy density rechargeable cells. Thus, the hybrid binder combined with the Si anode active material provides an anode with a flexible binder combination which may allow for initial pulverization as the anode expands and contracts during initial cycling of the cell resulting in an initial capacity decrease. The combination of the two previously incompatible binders provides a synergistic effect which better enables a balance between adhesion strength and first cycle efficiency, and which also shows an unexpected result of increased cycle life.

As described above, a Li-ion battery is disclosed. The Li-ion battery includes a cathode including a cathode current collector and an electroactive cathode material disposed on one or both sides of the cathode current collector, an anode comprising an anode current collector and a silicon electroactive anode material disposed on one or both sides of the anode current collector, wherein the silicon electroactive anode material includes a hybrid binder, the hybrid binder a mixture of an aqueous based binder and a non-aqueous based binder, the hybrid binder comprising a blending ratio of 10 wt. % to 90 wt. %, a separator material between the cathode and the anode, and an electrolyte in contact with the cathode, the anode, and the separator.

Further, a method of preparing an anode for use in a Li-ion cell is disclosed. The method includes receiving the negative electrode active material wherein the negative electrode active materials is a powder composite of silicon and graphite, combining the negative electrode active material with a hybrid binder with a mass ratio range of 0.1:1 to 9:1, the hybrid binder a combination of a non-aqueous binder and an aqueous binder, to form a mixture, coating the mixture on a copper current collector to form a laminate, and compressing the laminate to yield an anode.

In this way, Li-ion cells were made using Si anodes wherein the anode comprises a silicon electroactive material and a hybrid binder, such as PVDF/PAA, PVDF/CMC, PVDF/PAN, or PAN/PAA. The disclosed method for using a hybrid binder allows for PAA to be used in a solvent based system, or PVDF to be used in a water based system, for example. In this way, the binders may no longer be limited to a particular solvent. The unexpected combination of binders allows for blending previously non-soluble binders in order optimize characteristics of the individual binders to better withstand the volume changes of the Si anode while also better enabling adhesion.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A Li-ion battery, comprising:
a cathode comprising a cathode current collector and an electroactive cathode material disposed on one or both sides of the cathode current collector;
an anode comprising an anode current collector and a silicon electroactive anode material disposed on one or both sides of the anode current collector, wherein the silicon electroactive anode material includes a hybrid binder, the hybrid binder including a blend of polyacrylic acid (PAA) and a non-aqueous based binder, wherein PAA and the non-aqueous based binder are not cross-linked, and wherein the hybrid binder comprises a blending ratio of 10 wt. % to 90 wt. %;
a separator material between the cathode and the anode; and
an electrolyte in contact with the cathode, the anode, and the separator material.

2. The Li-ion battery of claim 1, wherein the non-aqueous based binder comprises polyvinylidene fluoride (PVDF) or polyacrylonitrile (PAN).

3. The Li-ion battery of claim 1, wherein the hybrid binder is a combination of PVDF and PAA.

4. The Li-ion battery of claim 3, wherein a mass ratio of PVDF and PAA is 2:1.

5. The Li-ion battery of claim 1, wherein a surface of the hybrid binder is hydrophobic or hydrophilic depending on a solvent system.

6. The Li-ion battery of claim 5, wherein the surface of the hybrid binder is hydrophobic and the solvent system is a non-aqueous solvent system.

7. The Li-ion battery of claim 5, wherein the surface of the hybrid binder is hydrophilic and the solvent system is an aqueous solvent system.

8. The Li-ion battery of claim 1, wherein the anode current collector is copper.

9. The Li-ion battery of claim 1, wherein the hybrid binder is present at a weight percent less than 15 wt. %.

10. The Li-ion battery of claim 1, wherein the hybrid binder is present at a weight percent of 10 wt. %.

11. The Li-ion battery of claim 1, wherein the silicon electroactive anode material further includes a carbon based conductive additive.

12. The Li-ion battery of claim 1, wherein the hybrid binder is a combination of PAN and PAA in an NMP-based system.

13. The Li-ion battery of claim 1, wherein the silicon electroactive anode material is pre-lithiated.

14. The Li-ion battery of claim 1, wherein the silicon electroactive anode material comprises silicon, an alloy or intermetallic compound of silicon, a silicon oxide, a silicon carbide, a silicon nitride, a silicon sulfide, a silicon phosphide, a silicon selenide, a silicon telluride, a silicon antimonide, or mixtures thereof.

15. The Li-ion battery of claim 1, wherein the silicon electroactive anode material comprises a silicon graphite composite powder.

16. The Li-ion battery of claim 15, wherein the silicon graphite composite powder comprises silicon nanowires grown on a graphite base.

17. The Li-ion battery of claim 1, wherein the silicon electroactive anode material is in the form of primary and secondary particles.

18. The Li-ion battery of claim 17, wherein the silicon electroactive anode material includes a carbonaceous precursor which deposits carbon on the primary and secondary particles upon application of heat.

19. The Li-ion battery of claim 17, wherein surfaces of the primary and secondary particles include carbonaceous deposits thereon.

20. The Li-ion battery of claim 1, wherein the hybrid binder is a two-component system.

\* \* \* \* \*